(12) United States Patent
Chen et al.

(10) Patent No.: US 10,295,871 B2
(45) Date of Patent: May 21, 2019

(54) LIQUID CRYSTAL DISPLAY PANEL AND LIQUID CRYSTAL DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Binbin Chen, Xiamen (CN); Bozhi Liu, Xiamen (CN); Bingping Liu, Xiamen (CN)

(73) Assignees: Xiamen Tianma Micro-Electronics Co., Ltd., Xiamen (CN); Tianma Micro-Electronics Co., Ltd., Shenzhen (CN)

(*) Notice: Subject to any disclaimer, the term of this patent is extended or adjusted under 35 U.S.C. 154(b) by 103 days.

(21) Appl. No.: 15/413,626

(22) Filed: Jan. 24, 2017

(65) Prior Publication Data
US 2017/0131579 A1  May 11, 2017

(30) Foreign Application Priority Data
Sep. 29, 2016  (CN) .......................... 2016 1 0863439

(51) Int. Cl.
G02F 1/1343 (2006.01)
(52) U.S. Cl.
CPC .................. G02F 1/134363 (2013.01); *G02F 2001/134381* (2013.01)
(58) Field of Classification Search
CPC ................................................ G02F 1/134363
See application file for complete search history.

(56) References Cited

U.S. PATENT DOCUMENTS

| 9,417,486 B2 | 8/2016 | Murata et al. |
| 2009/0109356 A1* | 4/2009 | Kitagawa .......... G02F 1/134363 349/33 |
| 2013/0032827 A1* | 2/2013 | Moon ............... G02F 1/136286 257/88 |
| 2013/0128165 A1* | 5/2013 | Lee ..................... G02F 1/13306 349/33 |

(Continued)

FOREIGN PATENT DOCUMENTS

| CN | 101533220 A | 9/2009 |
| CN | 102654672 A | 9/2012 |

(Continued)

*Primary Examiner* — Edmond C Lau
(74) *Attorney, Agent, or Firm* — Anova Law Group, PLLC (57) ABSTRACT

A liquid crystal display panel and a liquid crystal display device are provided. The liquid crystal display panel comprises a first substrate, a second substrate, a liquid crystal layer sandwiched between the first and second substrate, and an auxiliary electrode. The first substrate includes a plurality of gate electrode lines and a plurality of data lines intersected to define a plurality of pixel units. Each pixel unit corresponds to a pixel electrode and a common electrode. In each region corresponding to one pixel unit, the pixel electrode and the common electrode are configured to form an electric field that drives the liquid crystal layer. A vertical projection of the auxiliary electrode on the first substrate covers an area where the electric field is formed by the pixel electrode and the common electrode, and a thickness of the liquid crystal layer is less than or equal to 3.2 μm.

20 Claims, 6 Drawing Sheets

(56) References Cited

U.S. PATENT DOCUMENTS

2015/0153619 A1\* 6/2015 Murata ................ G02F 1/1337
349/123
2017/0184885 A1\* 6/2017 Chung ................ G02F 1/1323

FOREIGN PATENT DOCUMENTS

| CN | 102132199 B | 11/2013 |
|----|-------------|---------|
| CN | 103698942 A | 4/2014 |
| CN | 104536219 A | 4/2015 |
| CN | 104730607 A | 6/2015 |
| CN | 104950532 A | 9/2015 |
| CN | 204945548 U | 1/2016 |
| CN | 105446014 A | 3/2016 |

\* cited by examiner

LIQUID CRYSTAL DISPLAY PANEL AND LIQUID CRYSTAL DISPLAY DEVICE

CROSS-REFERENCES TO RELATED APPLICATIONS

This application claims priority of Chinese Patent Application No. 201610863439.6, filed on Sep. 29, 2016, the entire contents of which are hereby incorporated by reference.

FIELD OF THE INVENTION

The present disclosure generally relates to the field of liquid crystal display technology and, more particularly, relates to a liquid crystal display panel and a liquid crystal display device.

BACKGROUND

Because of their low driving voltage, low power consumption, high reliability, large amount of display information, flicker-free display, and low cost, etc., the liquid crystal display devices are a type of ideal display devices and have been widely applied in people's daily lives and work. In particular, a liquid crystal display device includes a plurality of pixel units and displays images by emitting light from each region corresponding to one of the pixel units. However, the light emitted from adjacent pixel units often mix with each other, resulting in the occurrence of color shift in existing liquid crystal display devices, which lowers the display effect of the liquid crystal display devices.

The disclosed liquid crystal display panel and liquid crystal display device are directed to solving at least partial problems set forth above and other problems.

BRIEF SUMMARY OF THE DISCLOSURE

One aspect of the present disclosure provides a liquid crystal display panel. The liquid crystal display panel includes a first substrate, a second substrate arranged opposite to the first substrate, a liquid crystal layer sandwiched between the first substrate and the second substrate, and an auxiliary electrode disposed on one side of the liquid crystal layer facing away the first substrate and coupled to a reference voltage. The first substrate includes a plurality of gate electrode lines and a plurality of data lines, the plurality of gate electrode lines intersects the plurality of data lines to define a plurality of pixel units. The first substrate further includes a plurality of pixel electrodes and a plurality of common electrodes insulated from the plurality of pixel electrodes. In each region corresponding to one-pixel unit, a pixel electrode and a common electrode are configured to form an electric field that drives the liquid crystal layer. A vertical projection of the auxiliary electrode on the first substrate covers an area where the electric field is formed by the pixel electrode and the common electrode, and a thickness of the liquid crystal layer is less than or equal to 3.2 µm.

Another aspect of the present disclosure provides a liquid crystal display device. The liquid crystal display device includes a liquid crystal display panel. The liquid crystal display panel includes a first substrate, a second substrate arranged opposite to the first substrate, a liquid crystal layer sandwiched between the first substrate and the second substrate, and an auxiliary electrode disposed on one side of the liquid crystal layer facing away the first substrate and coupled to a reference voltage. The first substrate includes a plurality of gate electrode lines and a plurality of data lines, the plurality of gate electrode lines intersects the plurality of data lines to define a plurality of pixel units. The first substrate further includes a plurality of pixel electrodes and a plurality of common electrodes insulated from the plurality of pixel electrodes. In each region corresponding to one pixel unit, a pixel electrode and a common electrode are configured to form an electric field that drives the liquid crystal layer. A vertical projection of the auxiliary electrode on the first substrate covers an area where the electric field is formed by the pixel electrode and the common electrode, and a thickness of the liquid crystal layer is less than or equal to 3.2 µm.

Other aspects of the present disclosure can be understood by those skilled in the art in light of the description, the claims, and the drawings of the present disclosure.

BRIEF DESCRIPTION OF THE DRAWINGS

To make more clearly the explanation of technical solutions in embodiments of the present disclosure or current techniques, drawings needed in the embodiments or current techniques are briefly illustrated below. Apparently, the drawings described below only correspond to some embodiments of the present disclosure, and it is possible for those ordinarily skilled in the art to derive other drawings from the accompanying drawings without creative effort.

DETAILED DESCRIPTION

The technical solutions in the embodiments of the present disclosure will be described as follows in a clear and complete manner with reference to the accompanying drawings in the embodiments of the present disclosure. Clearly, the embodiments described below are merely a part of, rather than entire, embodiments of the present disclosure. On the basis of the embodiments of the present disclosure, all other embodiments obtainable by those ordinarily skilled in the art without creative effort shall fall within the protection scope of the present disclosure.

As discussed above, a liquid crystal display device includes a plurality of pixel units and displays images by emitting light from each region corresponding to one of the pixel units. However, the light emitted from adjacent pixel units often mix with each other, resulting in the occurrence of color shift in existing liquid crystal display devices, which lowers the display effect of the liquid crystal display devices.

In particular, each pixel unit includes a driving electrode formed by a pixel electrode and a common electrode, and the driving electrode is configured to form an electric field that drives liquid crystal molecules in the liquid crystal layer. In existing liquid crystal display devices, because an electric field in each region corresponding to one pixel unit is relatively divergent, the electric field not only controls the liquid crystal molecules in the region corresponding to the one pixel unit to deflect, but also influence liquid crystal molecules in a region corresponding to the spacing between adjacent pixel units. Thus, light may be emitted from the spacing between adjacent pixel units. Accordingly, the light emitted from adjacent pixel units often mix with each other, resulting in the occurrence of color shift in existing liquid crystal display devices.

Directed to solving at least partial problems set forth above and other problems, the present disclosure provides an improved liquid crystal display panel and liquid crystal display device. According to the present disclosure, an auxiliary electrode is provided and, in each region corresponding to one pixel unit, the area where an electric field is formed by a pixel electrode and a common electrode is configured to correspond to the auxiliary electrode. Thus, the auxiliary electrode controls each electric field formed by one pixel electrode and one common electrode to be more concentrated in each region corresponding to one pixel unit.

Accordingly, the influence of the electric field on the liquid crystal molecules corresponding to the spacing between two adjacent pixel units that leads to deflection of the liquid crystal molecules and light transmission may be avoided. That is, light may not be emitted from the spacing between adjacent pixel units. Thus, a color mixture of the lights respectively emitted from adjacent pixel units may be avoided, thus ensuring good display effect of the liquid crystal display device.

Further, because the electric field in each region corresponding to one pixel unit is more concentrated, the liquid crystal molecules in each region corresponding to one pixel unit may be better controlled, thus enhancing the light transmittance of the liquid crystal display device. Hereinafter, technical solutions provided by the present disclosure are illustrated with reference to the accompanying drawings FIG. 1A~FIG. 8.

Figure 1A:
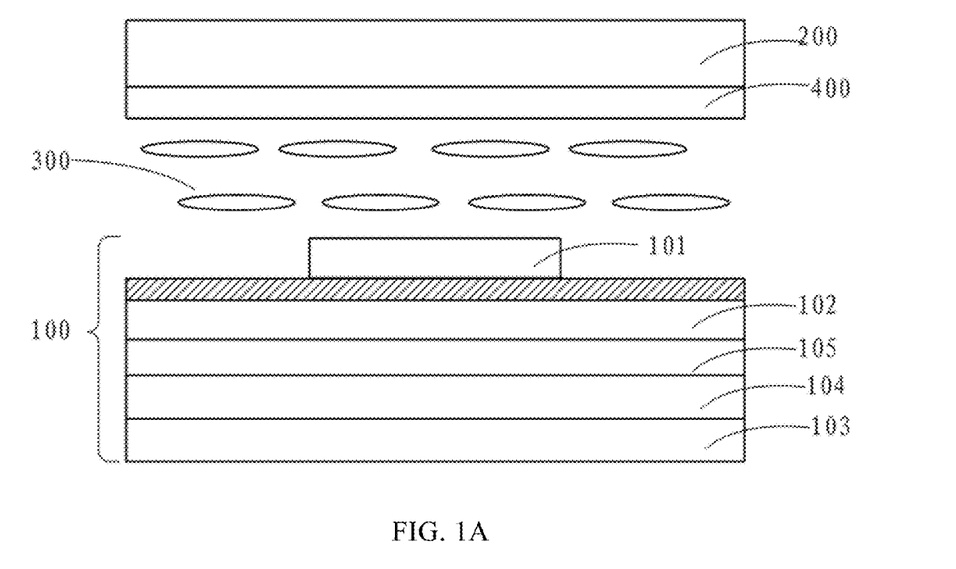
FIG. 1A illustrates an exemplary liquid crystal display panel consistent with disclosed embodiments.

FIG. 1A illustrates an exemplary liquid crystal display panel consistent with disclosed embodiments. As shown in FIG. 1A, the liquid crystal display panel may include an array substrate (i.e., a first substrate) 100, a color film substrate (i.e., a second substrate) 200, a liquid crystal layer 300, and an auxiliary electrode 400. The color film substrate 200 arranged opposite to the array substrate 100. The liquid crystal layer 300 may be encapsulated between the array substrate 100 and the color film substrate 200, and the thickness of the liquid crystal layer 300 may not exceed 3.2 µm. The auxiliary electrode 400 may be disposed on one side of the liquid crystal layer 300 facing away the array substrate 100, and may be coupled to a reference voltage.

In particular, the array substrate 100 may include a plurality of pixel electrodes 101, and a plurality of common electrodes 102 insulated from the plurality of pixel electrodes 101. The array substrate may further include a carrier substrate 103, a transistor array layer 104, and a planarization layer 105. The transistor array layer 104 may be disposed on one surface of the carrier substrate 103, and the planarization layer 105 may be disposed on one side of the transistor array layer 104 facing away the carrier substrate 103. The plurality of pixel electrodes 101 and the plurality of common electrodes 102 may be disposed on one side of the planarization layer 105 facing away the carrier substrate 103.

The array substrate 100 may further include a plurality of gate electrode lines and a plurality of data lines. Optionally, the plurality of gate electrode lines and the plurality of data lines may be disposed on the transistor array layer 104. Further, the plurality of gate electrode lines and the plurality of data lines may intersect and define a plurality of pixel units. Each pixel unit may correspond to one pixel electrode 101 and one common electrode 102.

Further, in each region corresponding to one pixel unit, the pixel electrode 101 and the common electrode 102 may be configured to form an electric field that drives the liquid crystal layer 300. A vertical projection of the auxiliary electrode 400 on the array substrate 100 may cover the area where an electric field is formed by the pixel electrode 101 and the common electrode 102. That is, in each region corresponding to one pixel unit, the area where an electric field is formed by the pixel electrode 101 and the common electrode 102 may correspond to the auxiliary electrode 400.

In particular, the disclosed auxiliary electrode 400 may be a one-piece block electrode, a patterned electrode showing a specific pattern, or an electrode in other shapes designed according to actual applications. The present disclosure is not intended to limit the shape of the auxiliary electrode 400, as long as the vertical projection of the auxiliary electrode 400 on the array substrate covers each area where an electric field is formed by one pixel electrode 101 and one common electrode 102.

Further, the auxiliary electrode 400 may control the electric field in each region corresponding to one pixel unit to be more concentrated, and the more concentrated electric field may not affect the liquid crystal molecules corresponding to the spacing between two adjacent pixel units. Accordingly, light may not be emitted from the spacing between adjacent pixel units, and a color mixture of the lights respectively emitted from adjacent pixel units may be avoided, thus ensuring good display effect of the liquid crystal display device. Further, the more concentrated electric field may also effectively enhance the light transmittance of the liquid crystal display device.

Figure 1B:
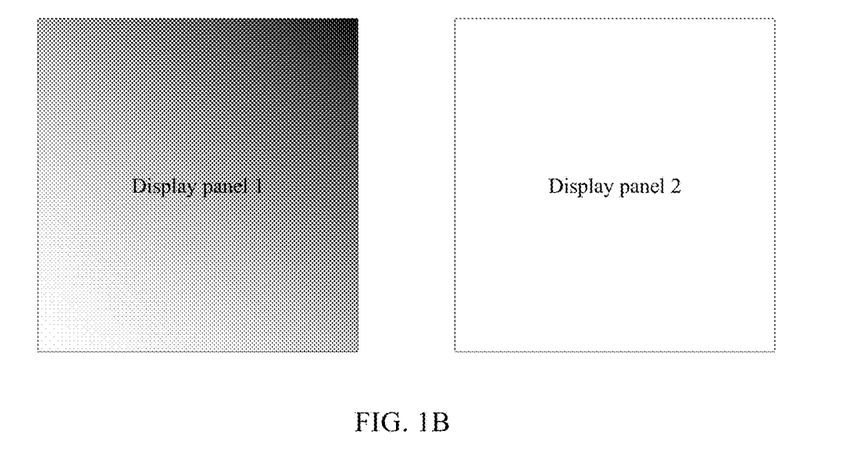
FIG. 1B illustrates a comparison of display effects between an existing liquid crystal display panel and an exemplary liquid crystal display panel consistent with disclosed embodiments.
Figure 1C:
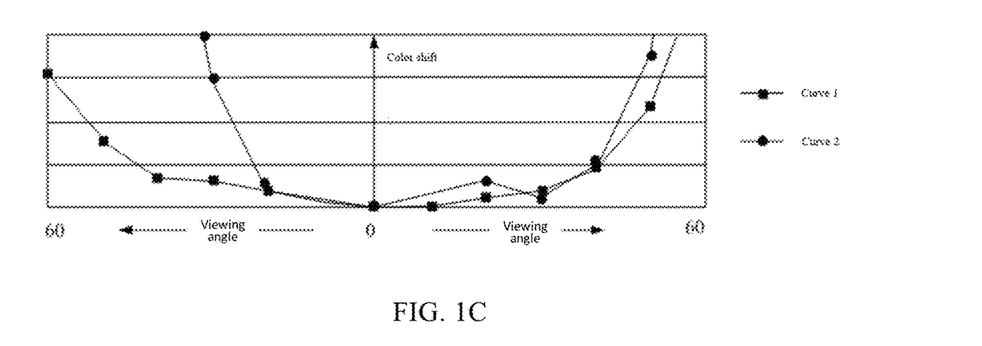
FIG. 1C illustrates another comparison of display effects between an existing liquid crystal display panel and an exemplary liquid crystal display panel consistent with disclosed embodiments.

FIG. 1B and FIG. 1C illustrate two different kinds of comparison regarding the display effect between an existing liquid crystal display panel and an exemplary liquid crystal display panel consistent with disclosed embodiments, respectively. Specifically, FIG. 1B illustrates a comparison of display effect between an existing liquid crystal display panel and an exemplary liquid crystal display panel when both display panels are viewed by a bystander in the same oblique viewing direction. The thickness of the liquid crystal layer in the display panel 1 may be same as the thickness of the liquid crystal layer in the display panel 2.

In particular, the display panel 1 illustrates the display effect of an existing display panel when being viewed in an oblique viewing direction, and a significant color shift may be observed. The display panel 2 illustrates the display effect of an exemplary display panel when being viewed in the same oblique viewing direction as the display panel 1, and no significant color shift may be observed. Thus, the disclosed liquid crystal display panel may provide improved display effects.

FIG. 1C illustrates a comparison of color shift between an existing liquid crystal display panel and an exemplary liquid crystal display panel at various viewing angles. The thickness of the liquid crystal layer in the existing liquid crystal display panel may be the same as the thickness of the liquid crystal layer in the exemplary liquid crystal display panel. Specifically, curve 1 illustrates the color shift of an exemplary liquid crystal display panel at a Series of viewing angles, and curve 2 illustrates the color shift of an existing liquid crystal display panel at the same series of viewing angles. As shown in curve 1 and curve 2, at the same viewing angle, curve 1 basically shows smaller color shift than curve 2. Thus, the disclosed liquid crystal display panel may effectively alleviate the color shift phenomenon, indicated by providing reduced color shift values at most viewing angles selected for the color shift test.

Figure 2:
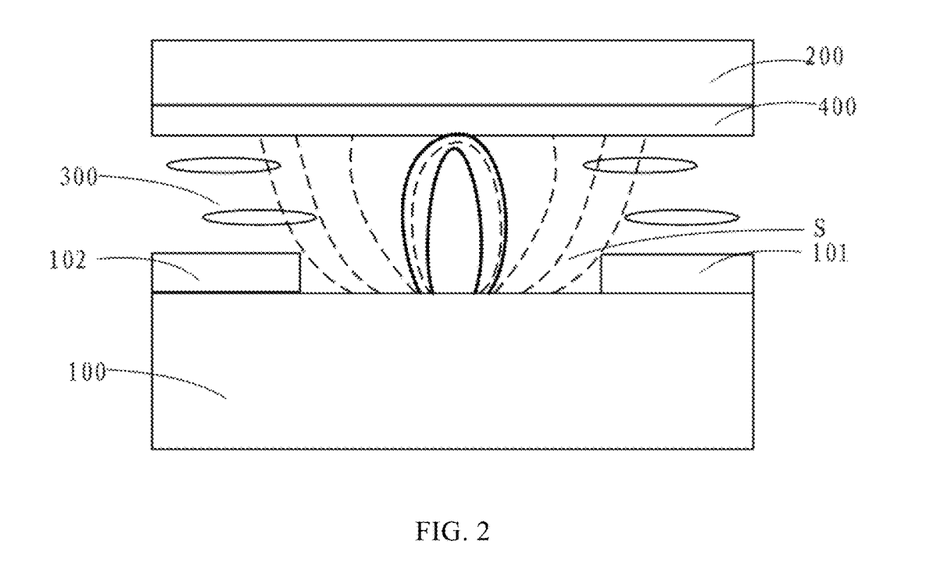
FIG. 2 illustrates an exemplary electric field formed by a pixel electrode and a common electrode consistent with disclosed embodiments.

FIG. 2 illustrates an exemplary electric field formed by a pixel electrode and a common electrode consistent with disclosed embodiments. A shown in FIG. 2, the disclosed pixel electrode 101 and the common electrode 102 may be disposed on the same electrically conductive layer. That is, the disclosed pixel electrode 101 may be disposed on the same layer as the disclosed common electrode 102. In particular, in each region corresponding to one pixel unit, a space pattern S of the electric field may be formed between the pixel electrode 101 and the common electrode 102, and the vertical projection of the auxiliary electrode 400 on the array substrate 100 may cover the space pattern S.

Referring to FIG. 2, the pixel electrode 101 and the common electrode 102 may be disposed on the same electrically conductive layer. To form an electric field that drives the liquid crystal layer 300, a space pattern S may need to be formed between the pixel electrode 101 and the common electrode 102. In particular, the present disclosure is not intended to limit the specific shape of the space pattern S, and the shape of the space pattern S may be specifically designed according to practical applications.

Further, referring to FIG. 2, the existence of the auxiliary electrode 400 may ensure that the electric field formed between the pixel electrode 101 and the common electrode 102 is more concentrated. For example, as shown in FIG. 2, the electric field (solid line) formed between the pixel electrode 101 and the common electrode 102 with the auxiliary electrode 400 may be more concentrated than the electric field (dashed line) formed between the pixel electrode 101 and the common electrode 102 without the auxiliary electrode 400. Thus, by providing an auxiliary electrode corresponding to the electric field formed by a pixel electrode and a common electrode, the color shift phenomenon of the liquid crystal display device may be alleviated, and the light transmittance of the liquid crystal display device may be effectively enhanced.

Figure 3:
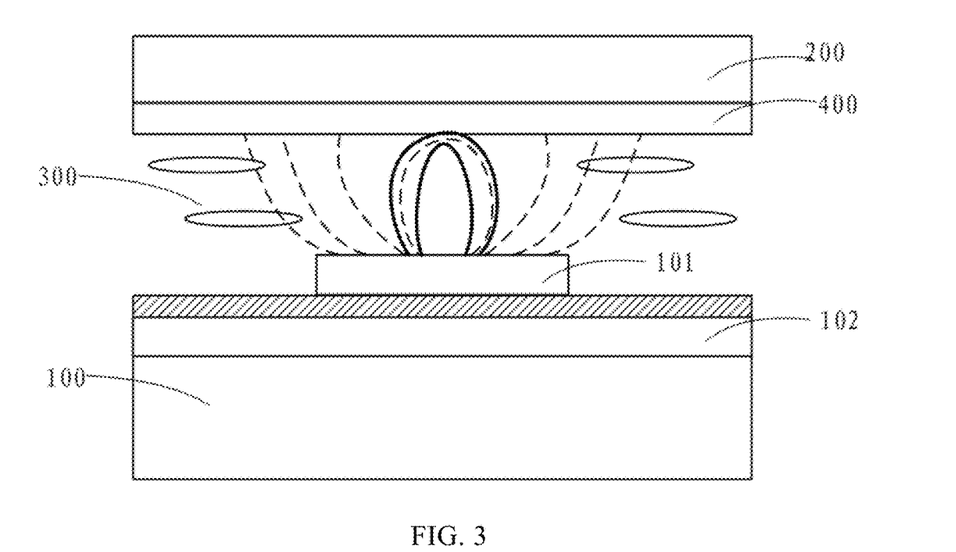
FIG. 3 illustrates another exemplary electric field formed by a pixel electrode and a common electrode consistent with disclosed embodiments.

Optionally, the disclosed pixel electrode 101 and the common electrode 102 may be disposed on different electrically conductive layers. For example, the pixel electrode 101 may be disposed on one side of the common electrode 102 facing towards the liquid crystal layer 300. FIG. 3 illustrates an exemplary electric field formed by a pixel electrode and a common electrode consistent with disclosed embodiments. As shown in FIG. 3, the disclosed pixel electrode 101 may be disposed on one side of the common electrode 102 facing towards the liquid crystal layer 300.

In particular, in each region corresponding to one pixel unit, the pixel electrode 101 may form a driving electrode pattern. A vertical projection of the common electrode 102 on the pixel electrode 101 may cover the driving electrode pattern, and the vertical projection of the auxiliary electrode 400 on the array substrate 100 may cover the driving electrode pattern.

Further, referring to FIG. 3, the pixel electrode 101 and the common electrode 102 may be disposed on different layers and, in particular, the pixel electrode 101 may be disposed on one side of the common electrode 102 facing towards the liquid crystal layer 300. Specifically, in each region corresponding to one pixel unit, the driving electrode pattern formed in the pixel electrode 101 may be the shape of an actual solid electrode. Thus, an electric field may be formed by the driving electrode pattern and the common electrode 102.

In particular, the present disclosure is not intended to limit the specific shape of the driving electrode pattern. That is, the shape of the driving electrode pattern may be specifically designed according to actual applications. Due to the existence of the auxiliary electrode 400, the electric field formed between the pixel electrode 101 and the common electrode 102 may be ensured to be more concentrated.

For example, as shown in FIG. 3, the electric field (solid line) formed by the pixel electrode 101 and the common electrode 102 with the auxiliary electrode 400 may be more concentrated than the electric field (dashed line) formed by the pixel electrode 101 and the common electrode 102 without the auxiliary electrode 400. Thus, by providing an auxiliary electrode corresponding to the electric field formed by a pixel electrode and a common electrode, the color shift phenomenon of the liquid crystal display device may be alleviated, and the transmission of the liquid crystal display device may be effectively enhanced.

Figure 4:
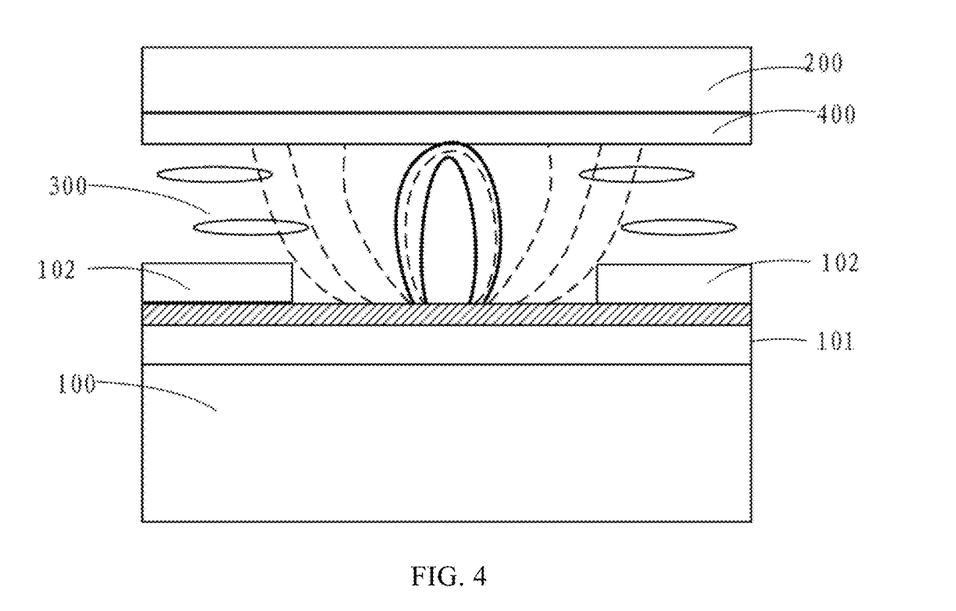
FIG. 4 illustrates another exemplary electric field formed by a pixel electrode and a common electrode consistent with disclosed embodiments.

Optionally, the pixel electrode 101 may be disposed on one side of the common electrode 102 facing away the liquid crystal layer 300. FIG. 4 illustrates an exemplary electric field formed by a pixel electrode and a common electrode consistent with disclosed embodiments. In particular, the disclosed pixel electrode 101 may be disposed on one side of the common electrode 102 facing away the liquid crystal layer 300.

Specifically, in each region corresponding to one pixel unit, the common electrode 102 may form a driving hollow pattern. The vertical projection of the pixel electrode 101 on the common electrode 102 may cover the driving hollow pattern, and the vertical projection of the auxiliary electrode 400 on the array substrate 100 may cover the driving hollow pattern.

Referring to FIG. 4, the pixel electrode 101 and the common electrode 102 may not be disposed on the same electrically conductive layer. Specifically, the pixel electrode 101 may be disposed on one side of the common electrode 102 facing away the liquid crystal layer 300. In particular, in each region corresponding to one pixel unit, a hollow driving hollow pattern may be formed in the common electrode 102, thus allowing the traverse of the electric field formed by the pixel electrode 101 and the common electrode 102.

In particular, the present disclosure is not intended to limit the shape of the driving hollow pattern. The shape of the driving hollow pattern may be designed according to practical applications. Due to the existence of the auxiliary electrode 400, the electric field formed between the pixel electrode 101 and the common electrode 102 may be more concentrated.

For example, as shown in FIG. 4, the electric field (solid line) formed between the pixel electrode 101 and the common electrode 102 with the auxiliary electrode 400 may be more concentrated than the electric field (dashed line) formed between the pixel electrode 101 and the common electrode 102 without the auxiliary electrode 400. Thus, by providing an auxiliary electrode corresponding to the electric field formed by a pixel electrode and a common electrode, the color shift phenomenon of the liquid crystal display device may be alleviated, and the light transmittance of the liquid crystal display device may be effectively enhanced.

In particular, when the pixel electrode 101 is disposed on one side of the common electrode 102 facing away the liquid crystal layer 300, because the vertical projection of the pixel electrode 101 on the common electrode 102 needs to cover the driving hollow pattern, the pixel electrode 101 may be a solid electrode having the same shape as the driving hollow pattern, or may be a block electrode. That is, in each region corresponding to one pixel unit, the pixel electrode 101 may have the same shape as the driving hollow pattern, or may be a block electrode.

Figure 5:
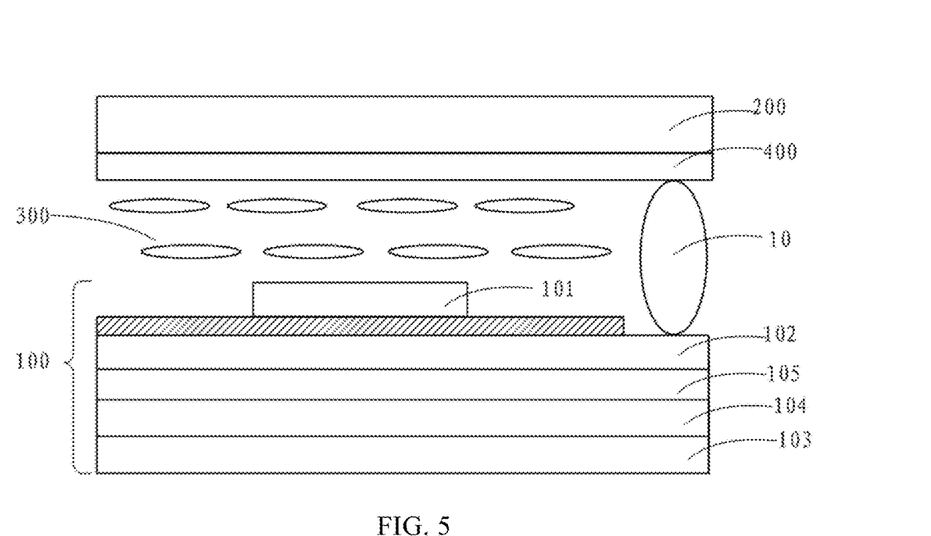
FIG. 5 illustrates an exemplary liquid crystal display device consistent with disclosed embodiments.

In one embodiment, the disclosed reference voltage may be a common electrode voltage and, in particular, the auxiliary electrode 400 may be electrically connected to the common electrode 102. FIG. 5 illustrates an exemplary liquid crystal display device consistent with disclosed embodiments. As shown in FIG. 5, the disclosed auxiliary electrode 400 may be electrically connected to the common electrode 102 via a golden ball 10. Optionally, in some other embodiments, the auxiliary electrode 400 may be electrically connected to the common electrode 102 via other methods. The present disclosure is not intended to limit the method for connecting the auxiliary electrode 400 to the common electrode 102.

The disclosed auxiliary electrode 400 may be arranged opposite to the array substrate 100, and the color film substrate may also be arranged opposite to the array substrate 100. Thus, in one embodiment, the disclosed auxiliary electrode 400 may be integrated into the color film substrate 200. Further, the disclosed auxiliary electrode 400 may be a transparent electrode. For example, the auxiliary electrode 400 may be made of indium tin oxide.

Figure 6A:
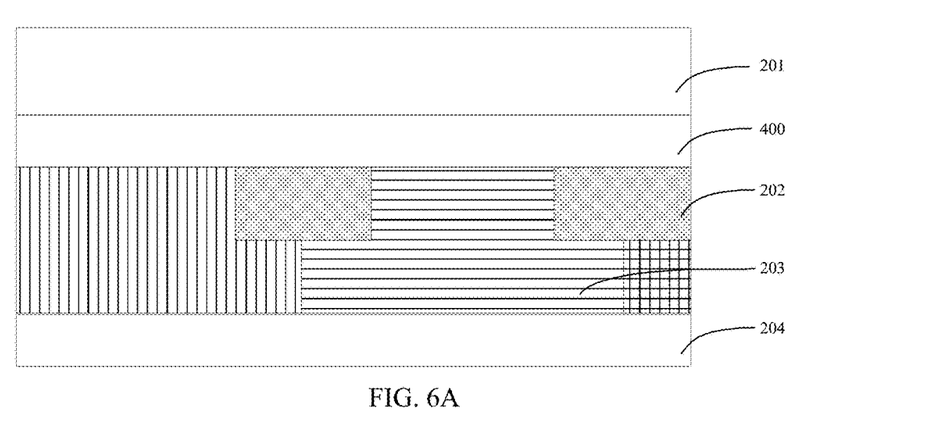
FIGS. 6A-6C illustrate exemplary color film substrates consistent with disclosed embodiments.
Figure 6B:
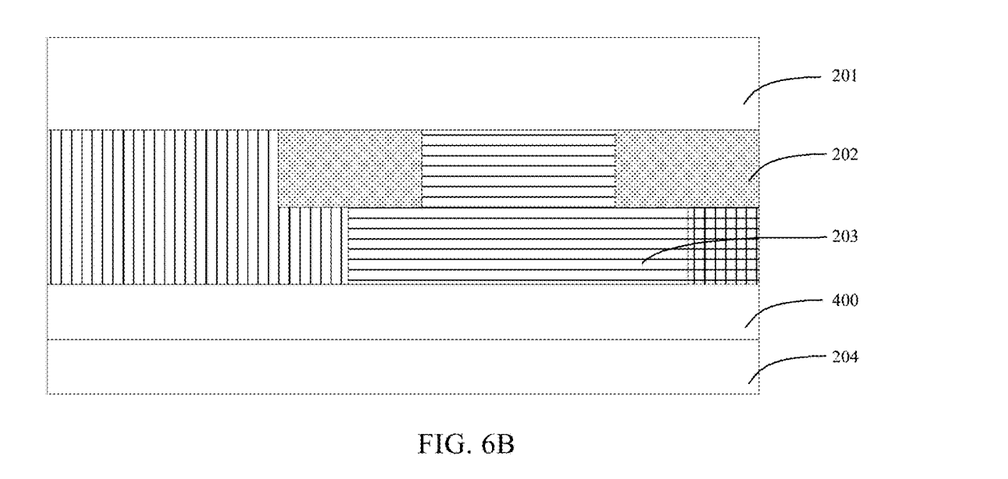
Figure 6C:
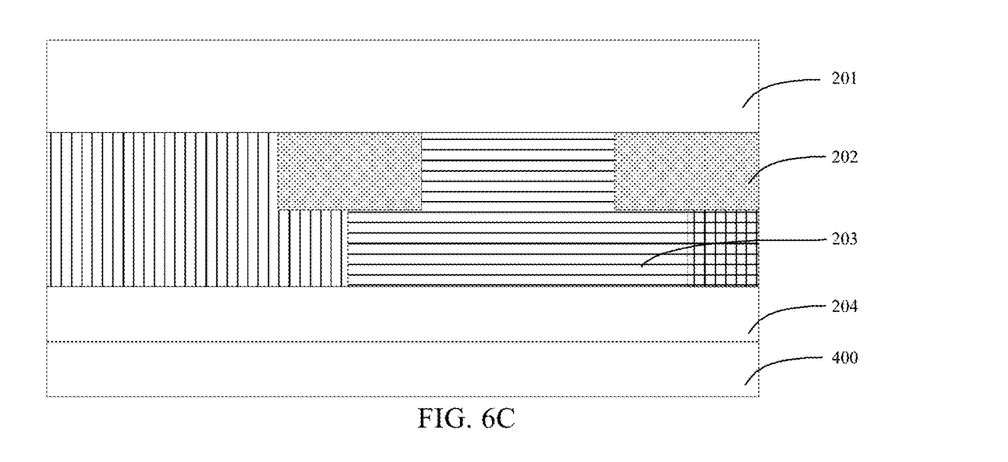

FIGS. 6A-6C illustrate exemplary color film substrates consistent with disclosed embodiments. Specifically, the color film substrate may include a third substrate 201, a black matrix layer (or a light-shielding layer) 202, a filter layer 203, and a planarization layer 204. The black matrix layer 202 may be disposed on one side of the third substrate 201 facing towards the liquid crystal layer 300. The filter layer 203 may fill the gaps in the black matrix layer 202 and extend to cover the black matrix layer 202. The planarization layer 204 may be disposed on one side of the filter layer 203 facing away the third substrate 201. In particular, FIG. 6A illustrates the auxiliary electrode 400 may be sandwiched between the black matrix layer 202 and the third substrate 201. Optionally, FIG. 6B illustrates the auxiliary electrode 400 may be sandwiched between the filter layer 203 and the planarization layer 204. Optionally, FIG. 6C illustrates the auxiliary electrode 400 may be disposed on surface of one side of the planarization layer 204 facing away the third substrate 201.

Figure 7:
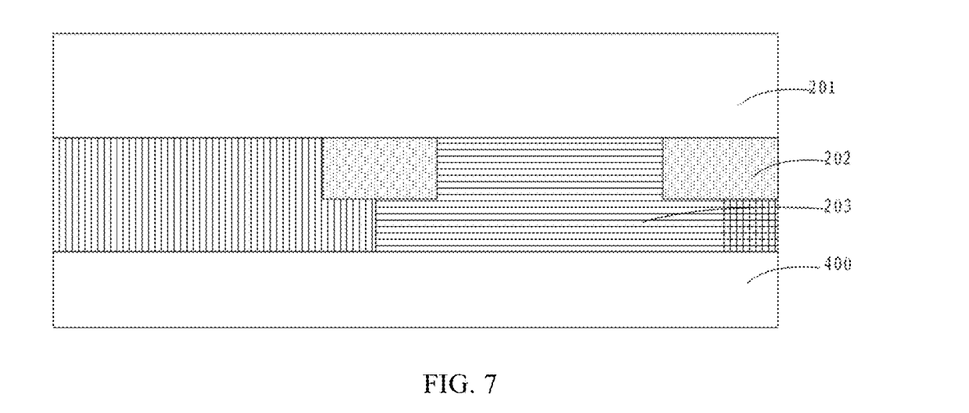
FIG. 7 illustrates another exemplary color film substrate consistent with disclosed embodiments.

Further, when the disclosed auxiliary electrode 400 is integrated into the color film substrate 200, the auxiliary electrode 400 may replace the planarization layer 204. FIG. 7 illustrates another exemplary color film substrate consistent with disclosed embodiments.

Specifically, the color film substrate may include a third substrate 201, a black matrix layer 202, a filter layer 203, and the auxiliary electrode 400. The black matrix layer 202 may be disposed on one side of the third substrate 201 facing towards the liquid crystal layer 300. The filter layer 203 may fill the gaps in the black matrix layer 202 and extend to cover the black matrix layer 202. The auxiliary electrode 400 may be disposed on one side of the filter layer 203 facing away the third substrate 201. In particular, the surface of the side of the auxiliary electrode 400 facing towards the liquid crystal layer 300 may be a flat surface.

In any of the above-described embodiment, the line width of the disclosed black matrix layer may not exceed 5 µm. That is, the black matrix layer may often have a grid shape, and each grid may include a hollow region and a solid shielding region. In particular, the hollow region may be an opening area, and the line width of the solid shielding area may be the same as the line width of the disclosed black matrix layer.

Optionally, the line width of the black matrix layer may be approximately 3 µm~4 µm, including the endpoint values. In particular, the line width of the black matrix layer may approximately be 2.5 µm, 3.5 µm, or 4.5 µm, etc. Further, the thickness of the disclosed liquid crystal layer may not exceed 3.2 µm. Optionally, the thickness of the liquid crystal layer may be approximately 2 µm~2.5 µm, including endpoint values. In particular, the thickness of the liquid crystal layer may approximately be 3.1 µm, 2.3 µm, or 1.9 µm, etc.

Further, in the disclosed liquid crystal display device, the liquid crystals in the liquid crystal layer may be negative liquid crystals. The disclosed liquid crystal display panel may, optionally, be an in-plane switching (IPS) panel. However, the present disclosure is not limited thereto. In other embodiments, the liquid crystal display panel may be other types of liquid crystal display panels.

Figure 8:
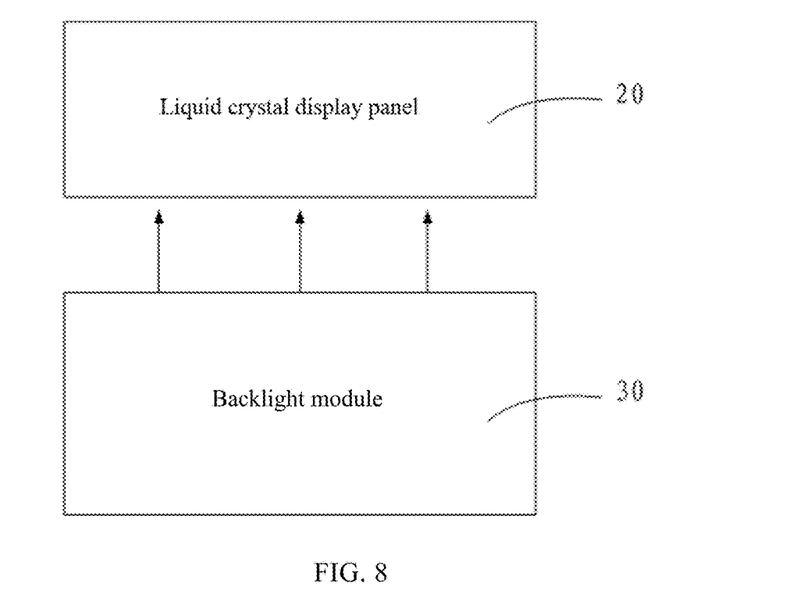
FIG. 8 illustrates another exemplary liquid crystal display device consistent with disclosed embodiments.

Correspondingly, the present disclosure provides a liquid crystal display device. FIG. 8 illustrates an exemplary liquid crystal display device consistent with disclosed embodiments. In particular, the liquid crystal display device may include the liquid crystal display panel 20 provided by any above embodiment. Further, the liquid crystal display device may include a backlight module 30 that supplies backlight (indicated by the arrows in FIG. 8) to the liquid crystal display panel 20.

The present disclosure provides a liquid crystal display panel and a liquid crystal display device. The liquid crystal display panel may include an array substrate, a color film substrate arranged opposite to the array substrate, and a liquid crystal layer sandwiched between the array substrate and the color film substrate. The array substrate may include a plurality of gate electrode lines and a plurality of data lines. The plurality of gate electrode lines and the plurality of data lines may intersect and define a plurality of pixel units.

The array substrate may also include insulated pixel electrodes and common electrodes. In each region corresponding to one pixel unit, a pixel electrode and a common electrode may be configured to form an electric field that drives the liquid crystal layer. Further, the liquid crystal display panel may also include an auxiliary electrode disposed on one side of the liquid crystal layer facing away the array substrate. The auxiliary electrode may be coupled to a reference voltage, and the vertical projection of the auxiliary electrode on the array substrate may cover the area where the electric field is formed by the pixel electrode and the common electrode.

From the above descriptions, in technical solutions provided by the present disclosure, an auxiliary electrode may be provided. In each region corresponding to one pixel unit, the area where an electric field is formed by the pixel electrode and the common electrode may be configured to correspond to the auxiliary electrode. Thus, the auxiliary electrode may control the electric field formed by one pixel electrode and one common electrode to be more concentrated in each region corresponding to one pixel unit.

Accordingly, the influence of the electric field on the liquid crystal molecules corresponding to the spacing between two adjacent pixel units that leads to deflection of the liquid crystal molecules and light transmission may be avoided. Further, a color mixture of the lights respectively emitted from adjacent pixel units may be avoided, thus ensuring a good display effect of the liquid crystal display device.

Further, because the electric field formed by one pixel electrode and one common electrode becomes more concentrated, the electric field may better control the liquid crystal molecules in each region corresponding to one pixel unit. Thus, the light transmittance of the liquid crystal display device may be enhanced.

The above descriptions of the disclosed embodiments tend to educate those skilled in the art to realize or use the present disclosure. Various modifications of these embodiments become apparent to those skilled in the art, and the basic principles defined in this specification can be realized in other embodiments without departing from the spirit or scope of the present disclosure. Accordingly, the present disclosure is not limited to the embodiments illustrated above, however, tends to satisfy the widest range consistent with the principles and novel ideas made common by the present disclosure.

What is claimed is:

1. A liquid crystal display panel, comprising:
   a first substrate;
   a second substrate arranged opposite to the first substrate;
   a liquid crystal layer sandwiched between the first substrate and the second substrate; and
   an auxiliary electrode disposed on one side of the liquid crystal layer facing away the first substrate and coupled to a reference voltage,
   wherein:
   the first substrate includes a plurality of gate electrode lines, a plurality of data lines, the plurality of gate electrode lines intersecting the plurality of data lines to define a plurality of pixel units, a plurality of pixel electrodes and a plurality of common electrodes being insulated from the plurality of pixel electrodes,
   the second substrate includes a base substrate and a black matrix layer disposed on one side of the base substrate facing towards the liquid crystal layer, and the auxiliary electrode is sandwiched between the black matrix layer and the base substrate,
   in each region corresponding to one pixel unit, a pixel electrode and a common electrode are configured to form an electric field that drives the liquid crystal layer,
   a vertical projection of the auxiliary electrode on the first substrate covers an area where the electric field is formed by the pixel electrode and the common electrode,
   the auxiliary electrode is electrically connected to the common electrode through a golden ball, a vertical projection of the golden ball on the first substrate non-overlapping with the pixel electrode, and
   a thickness of the liquid crystal layer is less than or equal to 3.2 μm.

2. The liquid crystal display panel according to claim 1, wherein:
   the first substrate is an array substrate; and
   the second substrate is a color film substrate.

3. The liquid crystal display panel according to claim 2, wherein:
   the pixel electrode and the common electrode are disposed on a same layer; and
   in each region corresponding to the one pixel unit, a space pattern of the electric field is formed between the pixel electrode and the common electrode, and the vertical projection of the auxiliary electrode on the array substrate covers the space pattern.

4. The liquid crystal display panel according to claim 2, wherein:
   the pixel electrode is disposed on one side of the common electrode facing towards the liquid crystal layer;
   in each region corresponding to the one pixel unit, the pixel electrode forms a driving electrode pattern, a vertical projection of the common electrode on the pixel electrode covers the driving electrode pattern, and the vertical projection of the auxiliary electrode on the array substrate covers the driving electrode pattern.

5. The liquid crystal display panel according to claim 1, wherein:
   the pixel electrode is disposed on one side of the common electrode facing away the liquid crystal layer; and
   in each region corresponding to the one pixel unit, the common electrode forms a driving hollow pattern, a vertical projection of the pixel electrode on the common electrode covers the driving hollow pattern, and the vertical projection of the auxiliary electrode on the array substrate covers the driving hollow pattern.

6. The liquid crystal display panel according to claim 5, wherein:
   in each region corresponding to the one pixel unit, a shape of the pixel electrode is the same as a shape of the driving hollow pattern.

7. The liquid crystal display panel according to claim 5, wherein:
   in each region corresponding to the one pixel unit, the pixel electrode is a block electrode.

8. The liquid crystal display panel according to claim 1, wherein:
   the reference voltage is a common electrode voltage; and
   the auxiliary electrode is electrically connected to the common electrode.

9. The liquid crystal display panel according to claim 2, wherein:
   the auxiliary electrode is integrated into the color film substrate.

10. The liquid crystal display panel according to claim 9, wherein the color film substrate includes:
    a third substrate as the base substrate;
    a filter layer filling gaps inside the black matrix layer and extending to cover the black matrix layer; and
    a planarization layer disposed on one side of the filter layer facing away the third substrate,
    wherein the auxiliary electrode is sandwiched between the filter layer and the planarization layer, or disposed on one side of the planarization layer facing away the third substrate.

11. The liquid crystal display panel according to claim 9, wherein the color film substrate includes:
    a third substrate as the base substrate;
    the filter layer filling gaps inside the black matrix layer and extending to cover the black matrix layer; and the auxiliary electrode disposed on one side of the filter layer facing away the third substrate, wherein a surface of the auxiliary electrode facing towards the liquid crystal layer is a flat surface.

12. The liquid crystal display panel according to claim 10, wherein:
a line width of the black matrix layer is less than or equal to 5 μm.

13. The liquid crystal display panel according to claim 11, wherein:
a line width of the black matrix layer is less than or equal to 5 μm.

14. The liquid crystal display panel according to claim 1, wherein:
a thickness of the liquid crystal layer is approximately 2 μm ~2.5 μm, including endpoint values.

15. The liquid crystal display panel according to claim 1, wherein:
liquid crystals in the liquid crystal layer are negative liquid crystals; and
the liquid crystal display panel is an in-plane switching panel.

16. A liquid crystal display device including a liquid crystal display panel, wherein the liquid crystal display panel comprises:
a first substrate;
a second substrate;
a liquid crystal layer sandwiched between the first substrate and the second substrate; and
an auxiliary electrode disposed on one side of the liquid crystal layer facing away the first substrate and coupled to a reference voltage,
wherein:
the first substrate includes a plurality of gate electrode lines, a plurality of data lines, the plurality of gate electrode lines intersecting the plurality of data lines to define a plurality of pixel units, a plurality of pixel electrodes and a plurality of common electrodes being insulated from the plurality of pixel electrodes,
the second substrate includes a base substrate and a black matrix layer disposed on one side of the base substrate facing towards the liquid crystal layer, and the auxiliary electrode is sandwiched between the black matrix layer and the base substrate,
in each region corresponding to one pixel unit, a pixel electrode and a common electrode are configured to form an electric field that drives the liquid crystal layer,
a vertical projection of the auxiliary electrode on the first substrate covers an area where the electric field is formed by the pixel electrode and the common electrode,
the auxiliary electrode is electrically connected to the common electrode through a golden ball, a vertical projection of the golden ball on the first substrate non-overlapping with the pixel electrode, and
a thickness of the liquid crystal layer is less than or equal to 3.2 μm.

17. The liquid crystal display device according to claim 16, wherein:
the first substrate is an array substrate; and
the second substrate is a color film substrate.

18. The liquid crystal display device according to claim 17, wherein:
the pixel electrode and the common electrode are disposed on a same layer; and
in each region corresponding to the one pixel units, a space pattern of the electric field is formed between the pixel electrode and the common electrode, and the vertical projection of the auxiliary electrode on the array substrate covers the space pattern.

19. The liquid crystal display panel according to claim 17, wherein:
the pixel electrode is disposed on one side of the common electrode facing towards the liquid crystal layer;
in each region corresponding to one pixel unit, the pixel electrode forms a driving electrode pattern, a vertical projection of the common electrode on the pixel electrode covers the driving electrode pattern, and the vertical projection of the auxiliary electrode on the array substrate covers the driving electrode pattern.

20. The liquid crystal display device according to claim 17, wherein:
the pixel electrode is disposed on one side of the common electrode facing away the liquid crystal layer; and
in each region corresponding to one pixel unit, the common electrode forms a driving hollow pattern, a vertical projection of the pixel electrode on the common electrode covers the driving hollow pattern, and the vertical projection of the auxiliary electrode on the array substrate covers the driving hollow pattern.

* * * * *